US012752703B2

(12) United States Patent
Shirai

(10) Patent No.: US 12,752,703 B2
(45) Date of Patent: Oct. 6, 2026

(54) FOLLOWING VEHICLE APPROACH NOTIFICATION DEVICE

(71) Applicant: TOYOTA JIDOSHA KABUSHIKI KAISHA, Toyota (JP)

(72) Inventor: Ryo Shirai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 18/904,609

(22) Filed: Oct. 2, 2024

(65) Prior Publication Data

US 2025/0206225 A1 Jun. 26, 2025

(30) Foreign Application Priority Data

Dec. 22, 2023 (JP) ................................ 2023-216514

(51) Int. Cl.
*B60Q 9/00* (2006.01)

(52) U.S. Cl.
CPC ..................................... *B60Q 9/00* (2013.01)

(58) Field of Classification Search
CPC ....................................................... B60Q 9/00
USPC ......................................................... 340/435
See application file for complete search history.

(56) References Cited

U.S. PATENT DOCUMENTS 9,969,261 B2 5/2018 Kodama
10,045,173 B1 8/2018 Morimura et al.
10,106,157 B2 10/2018 Sawada et al.
10,150,407 B2 12/2018 Takahashi et al.
10,696,297 B2 6/2020 Nguyen Van et al.
11,001,255 B2 5/2021 Fukuman et al.
11,110,937 B2 9/2021 Kinoshita et al.
2015/0321699 A1* 11/2015 Rebhan ........... B60W 30/18163 701/23
2018/0025645 A1* 1/2018 Schwindt ............... G08G 1/166 701/301
2019/0001968 A1 1/2019 Yorifuji et al.
2019/0344828 A1 11/2019 Omori et al.
2019/0389488 A1 12/2019 Yamada et al.

FOREIGN PATENT DOCUMENTS

JP 2012-048346 A 3/2012
JP 2014191632 A * 10/2014
JP 2018-092554 A 6/2018
JP 2021-128500 A 9/2021

* cited by examiner

*Primary Examiner* — Kerri L Mcnally
(74) *Attorney, Agent, or Firm* — SoraIP, Inc.

(57) ABSTRACT

A detection device capable of detecting the approach of a following vehicle to the host vehicle and a notification device for notifying a driver of the host vehicle of the approach of a following vehicle to the host vehicle are provided. When the approach of the following vehicle to the host vehicle is detected during the overtaking lane traveling, it is determined whether or not the lane can be changed from the overtaking lane to the traveling lane. When it is determined that the lane can be changed, the driver of the host vehicle is notified of the approach of the following vehicle to the host vehicle, and when it is determined that the lane cannot be changed, the driver of the host vehicle is stopped from notifying the driver of the following vehicle of the approach of the following vehicle to the host vehicle.

2 Claims, 5 Drawing Sheets

FOLLOWING VEHICLE APPROACH NOTIFICATION DEVICE

CROSS-REFERENCE TO RELATED APPLICATION

This application claims priority to Japanese Patent Application No. 2023-216514 filed on Dec. 22, 2023, incorporated herein by reference in its entirety.

BACKGROUND

1. Technical Field

The present disclosure relates to a following vehicle approach notification device.

2. Description of Related Art

A following vehicle may abruptly approach a host vehicle when the host vehicle is traveling along a fast lane, and the state where the following vehicle has approached the host vehicle then continues for a specific period of time or longer. A warning device adapted to issue a warning such as "the following vehicle is approaching abruptly", for example, for a driver of a host vehicle is known (see Japanese Unexamined Patent Application Publication No. 2012-48346 (JP 2012-48346 A), for example). The driver of the host vehicle is made aware of the abrupt approach of the following vehicle by issuing such a warning, thereby prompting the driver of the host vehicle to change the lane. Note that the warning device does not issue such a warning for the driver of the host vehicle even if the following vehicle abruptly approaches the host vehicle when the host vehicle is not traveling along the fast lane.

SUMMARY

However, there is a problem that if such a warning is issued for the driver of the host vehicle for a reason that the following vehicle has abruptly approached the host vehicle when the host vehicle is traveling along the fast lane under a situation in which the host vehicle cannot change the lane, the warning puts further pressure on the driver of the host vehicle.

In order to solve such a problem, the present disclosure provides a following vehicle approach notification device including:

a detection device that is able to detect approach of a following vehicle to a host vehicle; a notification device that notifies a driver of the host vehicle of the approach of a vehicle traveling behind to the host vehicle; and a processor, in which the processor acquires information regarding a lane of a road along which the host vehicle is traveling, determines whether a lane of the host vehicle is able to be changed from a fast lane to a slow lane when the approach of the following vehicle to the host vehicle is detected by the detection device during traveling along the fast lane, and causes the notification device to notify the driver of the host vehicle of the approach of the following vehicle to the host vehicle when the processor determines that the lane of the host vehicle is able to be changed from the fast lane to the slow lane, or stops causing the notification device to notify the driver of the host vehicle of the approach of the following vehicle to the host vehicle when the processor determines that the lane of the host vehicle is not able to be changed from the fast lane to the slow lane.

It is possible to reduce further pressure to be put to the driver of the host vehicle by stopping notifying the driver of the host vehicle of the approach of the following vehicle to the host vehicle when it is not possible to change the lane of the host vehicle from the fast lane to the slow lane.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First, the term used in the present disclosure will be described, in the present disclosure, a vehicle that is a control target according to the present disclosure is referred to as a "host vehicle", and a vehicle that is traveling following the host vehicle is referred to as a "following vehicle".

Figure 1:
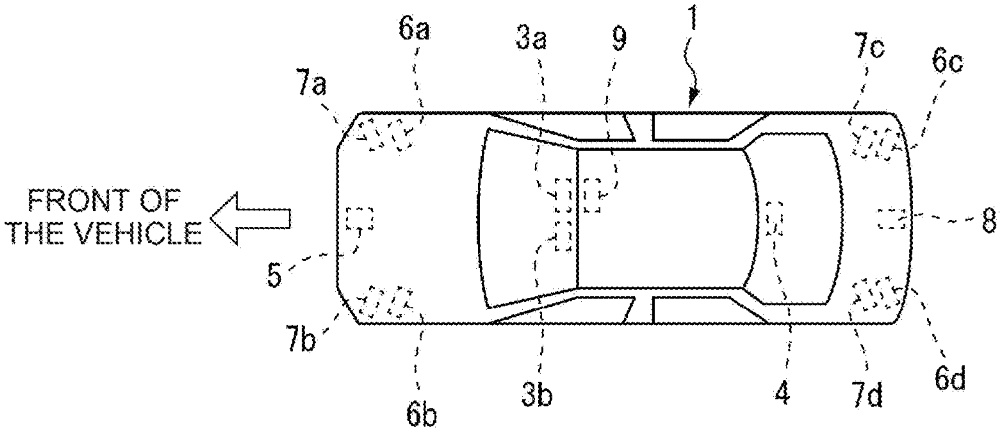
FIG. 1 is a top view of the host vehicle shown schematically.
Figure 2:
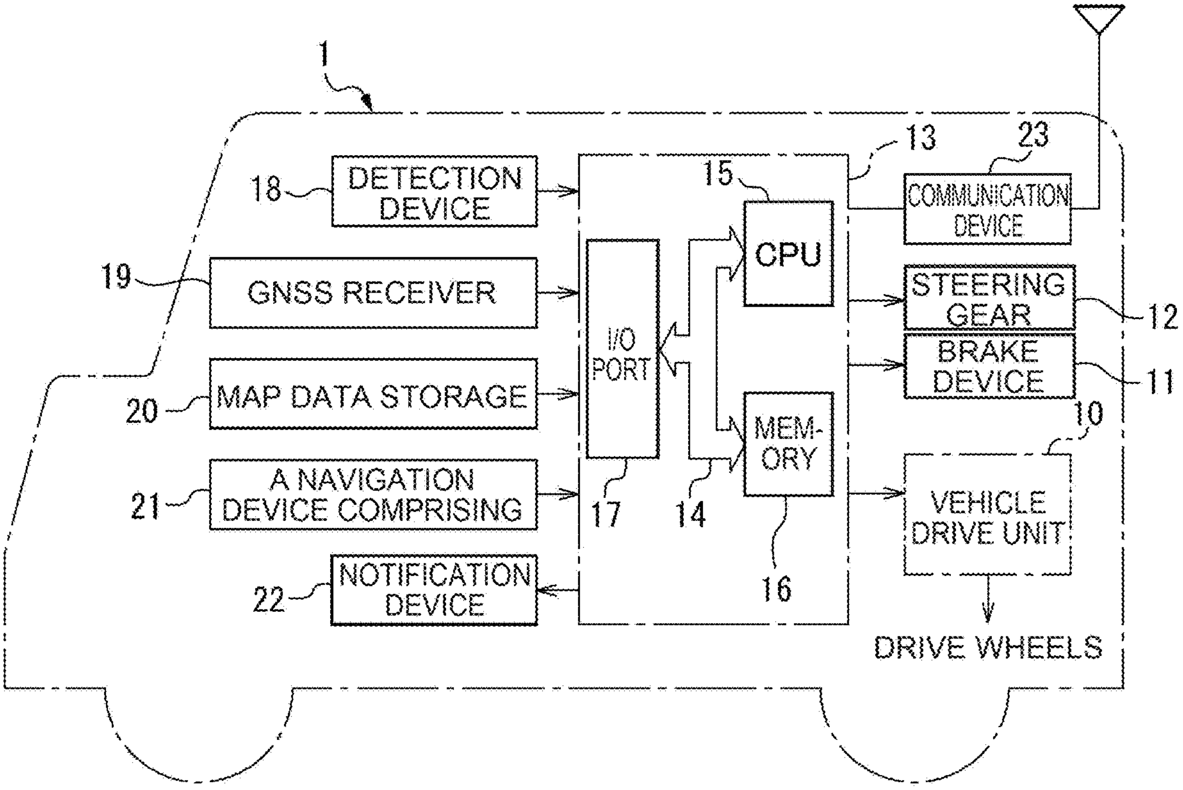
FIG. 2 is a diagram illustrating a functional configuration of the host vehicle.

FIG. 1 schematically shows a host vehicle 1 when viewed from above, and FIG. 2 shows a functional configuration of the host vehicle 1 shown in FIG. 1. The host vehicle 1 can perform any of manual driving and automatic driving. Referring to FIG. 2, reference numeral 10 denotes a vehicle driving unit for applying a driving force to driving wheels of the vehicle 1, 11 denotes a braking device for braking the vehicle 1, 12 denotes a steering device for steering the vehicle 1, and 13 denotes an electronic control unit mounted in the vehicle 1. As shown in FIG. 2, the electronic control unit 13 includes a digital computer, equipped with a CPU (processor) 15, a memory 16 including a ROM and a RAM, and an input/output 17 connected to each other by a bi-directional buss 14.

On the other hand, as shown in FIG. 2, a detection device 18 including various sensors necessary for the host vehicle 1 to perform automatic driving is installed in the host vehicle 1. The detection device 18 includes a sensor for detecting the state of the host vehicle 1 and a sensor for detecting the periphery of the host vehicle 1. In this case, an acceleration sensor, a speed sensor, an azimuth angle sensor, and a geomagnetic sensor are used as sensors for detecting the state of the host vehicle 1. Further, as sensors for detecting the periphery of the host vehicle 1, cameras for photographing the front, side, and rear of the host vehicle 1, a LIDAR for detecting the front, side, and rear of the host vehicle 1, a radar, a clearance sonar, and the like are used.

FIG. 1 shows an example of a sensor installed in the host vehicle 1. In the embodiment shown in FIG. 1, a front camera 3*a*, 3*b* that captures an image of the front of the host vehicle 1, a rear camera 4 that captures an image of the rear of the host vehicle 1, and a long-range millimeter-wave radar 5 that emits millimeter waves toward the front of the host vehicle 1 are installed in the host vehicle 1. Further, in the embodiment shown in FIG. 1, the host vehicle 1 is provided with a medium-range millimeter-wave radar 6*a*, 6*b*, 6*c*, 6*d* that emits millimeter waves toward the side of the host vehicle 1, a LIDAR 7*a*, 7*b*, 7*c*, 7*d* that emits laser beams toward the side of the host vehicle 1, and a clearance sonar 8 that emits ultrasonic waves toward the rear of the host vehicle 1. In addition, a line-of-sight detection device 9 for detecting the direction of the line of sight of the driver is installed in the vehicle cabin. The line-of-sight detection device 9 includes, for example, an infrared LED for irradiating the eyeball of the driver with infrared rays and an infrared camera for detecting the reflected light of the infrared rays in the cornea, and the direction of the line of sight of the driver is detected from the reflected light of the infrared rays in the cornea. Note that the method of installing the camera and the sensor shown in FIG. 1 is merely an example, and there are various methods of installing the camera and the sensor.

Returning to FIG. 2, the host vehicle 1 is provided with a Global Navigation Satellite System (GNSS) receiving device 19, a map data storage device 20, a navigational device 21, and a notification device 22 that notifies the driver of the surrounding conditions. GNSS receiving device 19 can detect the present position of the host vehicle 1 (for example, the latitude and longitude of the host vehicle 1) based on information obtained from a plurality of satellites. Therefore, the present position of the host vehicle 1 can be acquired by GNSS receiving device 19. As GNSS receiving device 19, for example, a GPS receiving device is used. In addition, the map data storage device 20 stores map data and the like necessary for traveling of the host vehicle 1. The map data also includes information about the road. The detection device 18, GNSS receiving device 19, the map data storage device 20, the navigational device 21, and the notification device 22 are connected to the electronic control unit 13. The vehicle 1 is also equipped with a communication device 23 connected to the electronic control unit 13.

In the example illustrated in FIG. 2, the host vehicle 1 can perform manual driving, and when the host vehicle 1 is requested to perform travel control by automatic driving, the host vehicle 1 can perform travel control by automatic driving. In the example illustrated in FIG. 2, the vehicle drive unit 10 of the host vehicle 1 is configured by an electric motor driven by a secondary battery or an electric motor driven by a fuel cell. The drive wheels are driven and controlled by these electric motors in accordance with the output signals of the electronic control unit 13. In the example shown in FIG. 2, when the vehicle 1 is requested to perform travel control by automatic driving, braking control of the vehicle 1 is performed by the braking device 11 in accordance with an output signal from the electronic control unit 13. The steering control of the vehicle 1 is also performed by the steering device 12 in accordance with an output signal of the electronic control unit 13.

Figure 3:
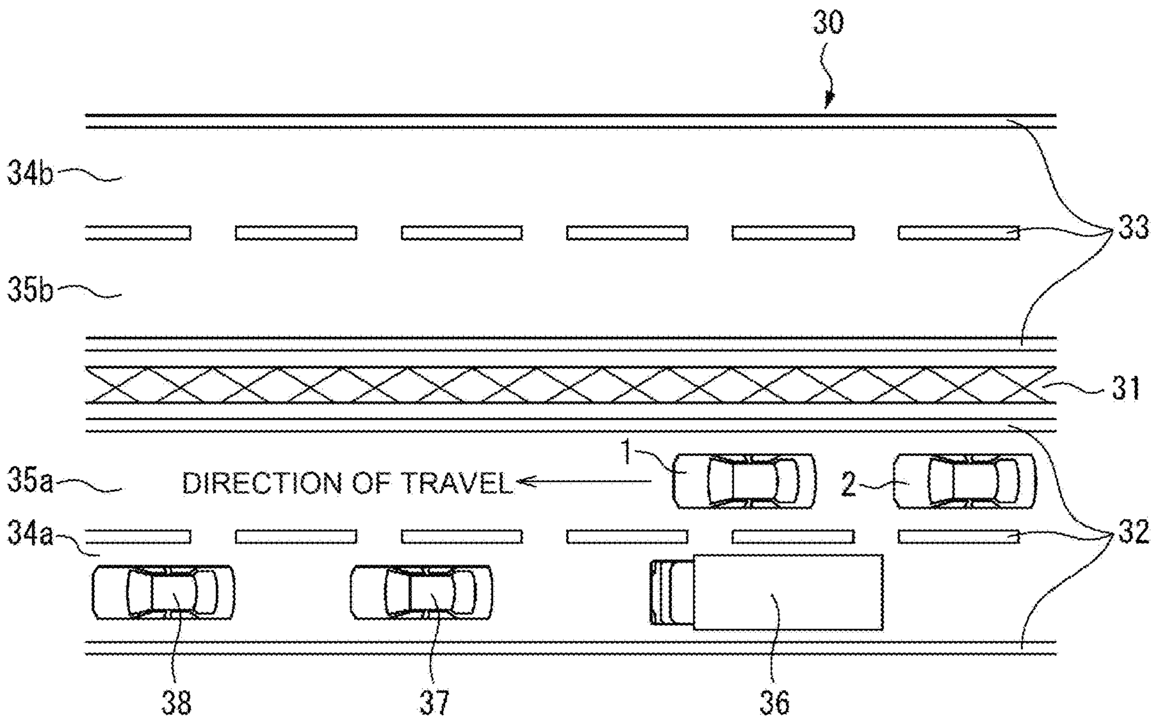
FIG. 3 is a top view of a road.
Figure 4:
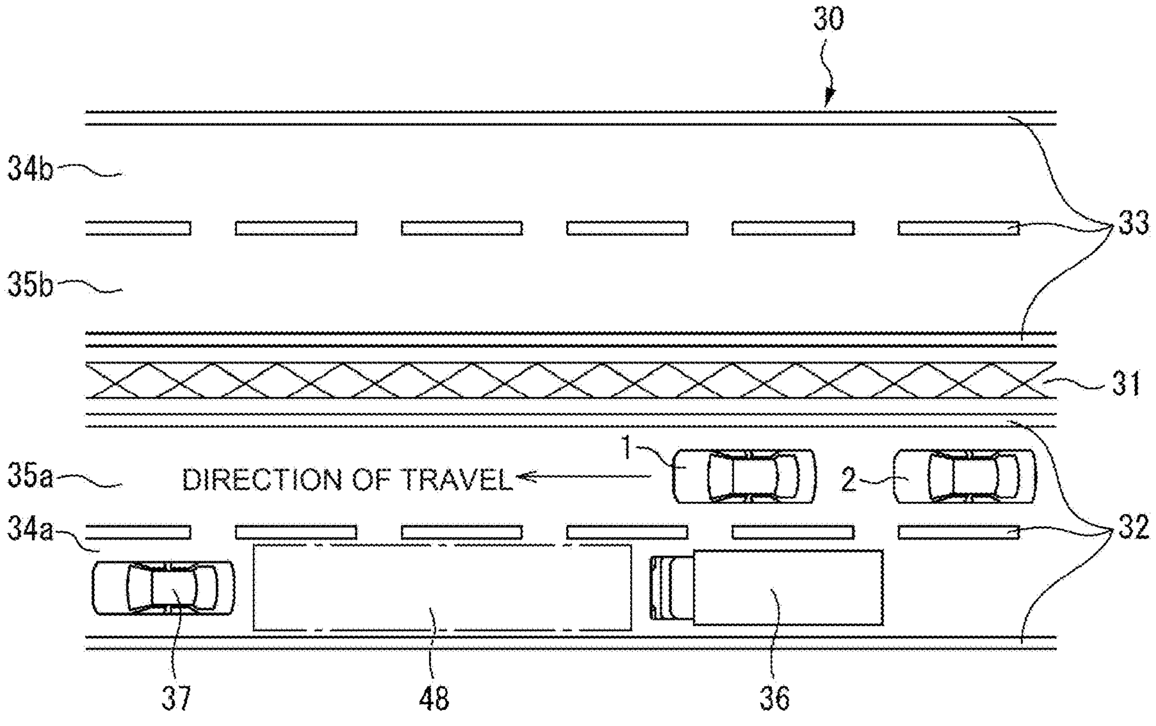
FIG. 4 is a top view of a road.

FIG. 3 and FIG. 4 show the road 30 when viewed from above. In FIG. 3 and FIG. 4, reference numeral 31 denotes a center separating zone, reference numerals 32 and 33 denote white lines, 34*a*, 34*b* denotes a traveling lane, and 35*a*, 35*b* denotes a fast lane. In addition, FIG. 3 and FIG. 4 show cases where the host vehicle 1 is traveling in the fast lane 35*a* and the following vehicle 2 is traveling in the fast lane 35*a* following the host vehicle 1. Further, FIG. 3 and FIG. 4 show cases where other vehicles 36, 37, and 38 are traveling in the traveling lane 34*a*.

FIG. 3 and FIG. 4 show a case where the following vehicle 2 approaches the subject vehicle 1 while the subject vehicle 1 is traveling in the fast lane 35*a*, and the following vehicle 2 is performing the fueling operation with respect to the subject vehicle 1. Such fuzzy driving is difficult for the driver of the host vehicle 1 to withstand, and the driver of the host vehicle 1 usually desires to be released from such fuzzy driving state. In this case, as a method of opening the driver of the host vehicle 1 from such an instigated driving state, there is the following example. When the following vehicle 2 approaches the host vehicle 1 while the host vehicle 1 is traveling in the fast lane 35*a*, it is conceivable to notify the driver of the host vehicle 1 of the approach of the following vehicle 2 to the host vehicle 1 and prompt the driver of the host vehicle 1 to change the lane in the traveling lane 34*a*.

Incidentally, when the driver of the host vehicle 1 is notified of the approach of the following vehicle 2 to the host vehicle 1 as described above, as illustrated in FIG. 4, there may be a traveling lane space 40 in which the host vehicle 1 can enter in a traveling lane 34*a* located in front of the host vehicle 1. In this case, the lane of the host vehicle 1 can be changed from the fast lane 35*a* to the traveling lane 34*a*. Therefore, it is possible to open the driver of the host vehicle 1 from the instigated driving state. On the other hand, when the driver of the host vehicle 1 is notified of the approach of the following vehicle 2 to the host vehicle 1, as shown in FIG. 3, the distance between the other vehicles 36, 37, and 38 traveling in the traveling lane 34*a* located in front of the host vehicle 1 may be narrow. In this case, there is no traveling lane space 40 in which the host vehicle 1 can enter, as shown in FIG. 4, in the traveling lane 34*a* located in front of the host vehicle 1. Therefore, in this case, it is not possible to change the lane from the fast lane 35*a* to the traveling lane 34*a* of the host vehicle 1. In this way, when it is not possible to change the lane from the fast lane 35*a* to the traveling lane 34*a* of the host vehicle 1, when the driver of the host vehicle 1 is notified of the approach of the following vehicle 2 to the host vehicle 1, there is no advantage simply by promoting the burning of the driver of the host vehicle 1.

Therefore, in the present disclosure, when the following vehicle 2 approaches the subject vehicle 1 while the subject vehicle 1 is traveling in the fast lane 35*a*, when the lane can be changed from the fast lane 35*a* to the traveling lane 34*a* of the subject vehicle 1, the driver of the subject vehicle 1 is notified of the approach of the following vehicle 2 to the subject vehicle 1. On the other hand, when it is not possible to change the lane of the host vehicle 1 from the fast lane 35*a* to the traveling lane 34*a*, the driver of the host vehicle 1 is not notified of the approach of the following vehicle 2 to the host vehicle 1.

In order to achieve the present disclosure, as shown in FIG. 2, a detection device 18 capable of detecting the approach of the following vehicle 2 to the host vehicle 1 and a notification device 22 notifying the driver of the host vehicle 1 of the approach of the following vehicle 2 to the host vehicle 1 are provided in the present disclosure. In this case, the detection device 18 detects the approach of the following vehicle 2 to the host vehicle 1 using, for example, the image data of the rear camera 4 shown in FIG. 1 and the detection output of the clearance sonar 8. For example, the presence of the following vehicle 2 is confirmed based on the image data of the rear camera 4, and when the distance between the subject vehicle 1 and the following vehicle 2 calculated based on the detection output of the clearance sonar 8 is a set distance range, it is determined that the following vehicle 2 has approached the subject vehicle 1.

On the other hand, the notification of the approach of the following vehicle 2 to the host vehicle 1 by the notification device 22 is performed by word display, voice, or sound. In the case where the notification of the approach of the following vehicle 2 is made by the wording display, for example, "the following vehicle is approaching" or "the following vehicle is approaching" on the display screen installed on the dashboard in the vehicle cabin. Please change the lane in the driving lane, etc. is displayed. In this instance, the Head-up Display technique can also be used to display words on the windshield, such as "the following vehicles are approaching." In addition, when the notification of the approach of the following vehicle 2 is made by voice, for example, "the following vehicle is approaching" or "the following vehicle is approaching" from the speaker installed on the dashboard in the vehicle cabin. Sound such as "please change the lane to the traveling lane" is generated. In addition, when the notification of the approach of the following vehicle 2 is made by sound, a buzzer is installed in the vehicle cabin and the buzzer is sounded. As described above, in the embodiment according to the present disclosure, the notification of the approach of the following vehicle 2 to the host vehicle 1 includes the prompt of the lane change to the traveling lane 34*a* of the host vehicle 1 by at least one of the word indication, the sound, and the sound.

Further, in the embodiment according to the present disclosure, the detection device 18 detects whether or not there is a traveling lane space 40 in which the host vehicle 1 can enter. In this case, the detection device 18 detects whether or not there is a traveling lane space 40 in which the host vehicle 1 can enter. This detection is performed using, for example, the image data of the front camera 3*a*, 3*b* shown in FIG. 1, the detection output of the long-range millimeter-wave radar 5, the detection output of the medium-range millimeter-wave radar 6*b*, and the detection output of the LIDAR 7*b*. In this case, even when it is determined that there is no other vehicle in the traveling lane 34*a* located in front of the host vehicle 1 based on the images of the front camera 3*a*, 3*b* and the like, it is determined that there is a traveling lane space 40 in which the host vehicle 1 can enter.

As shown in FIG. 3, it is determined that the other vehicles 36, 37, and 38 are traveling in the traveling lane 34*a* located in front of the host vehicle 1 on the basis of the front camera 3*a*, 3*b*. Alternatively, as shown in FIG. 4, it may be determined that the other vehicles 36 and 37 are traveling in the traveling lane 34*a* located in front of the host vehicle 1. In these cases, the inter-vehicle distance from the host vehicle 1 to the other vehicle 36 closest to the host vehicle 1 is calculated on the basis of the image data of the front camera 3*a*, 3*b* and the like. When the inter-vehicle distance is equal to or greater than the set inter-vehicle distance, it is determined that there is a traveling lane space 40 in which the host vehicle 1 can enter. On the other hand, when the inter-vehicle distance from the host vehicle 1 to the other vehicle 36 closest to the host vehicle 1 is equal to or less than the set inter-vehicle distance, the inter-vehicle distance between the two vehicles 36 and 37 closest to the host vehicle 1 is calculated based on the images of the front camera 3*a*, 3*b* and the like. As illustrated in FIG. 4, when the inter-vehicle distance is equal to or greater than the set inter-vehicle distance, it is determined that there is a traveling lane space 40 in which the host vehicle 1 can enter.

Figure 5:
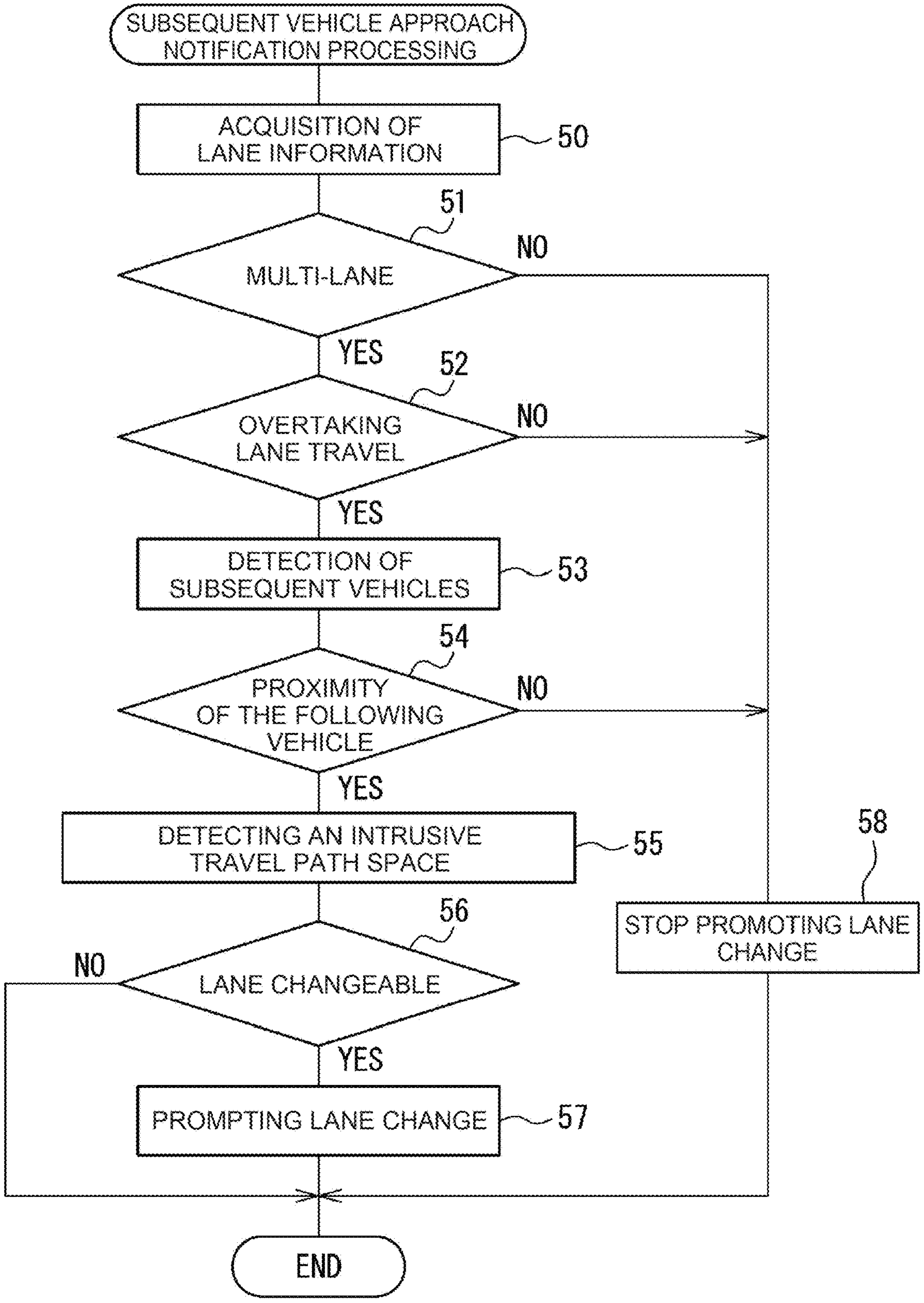
FIG. 5 is a flowchart for executing a following vehicle approach notification process.

FIG. 5 shows a routine for executing a following vehicle approach notification process for notifying the driver of the host vehicle 1 that the following vehicle 2 has approached the host vehicle 1. This routine is executed by interruption at regular time intervals in the electronic control unit 13 of the host vehicle 1.

Referring to FIG. 5, first, in step 50, information regarding a lane of a road on which the host vehicle 1 is currently traveling is acquired. The information on the lane includes information on whether the lane is one lane or a plurality of lanes. Note that the information regarding the lane can be obtained from the image data of the front camera 3*a*, 3*b* or the like, or can be obtained from the map data stored in the map data storage device 20 and the present position of the host vehicle 1. Next, in step 51, it is determined whether or not the road on which the host vehicle 1 is currently traveling is a plurality of lanes. When it is determined that the road on which the host vehicle 1 is currently traveling is a plurality of lanes, the process proceeds to step 52, and it is determined whether or not the host vehicle 1 is currently traveling in the overtaking lane based on the images of the front camera 3*a*, 3*b* and the like. In the examples shown in FIGS. 3 and 4, it is determined whether or not the host vehicle 1 is traveling in the lane on the center separation zone 31 side. When it is determined that the host vehicle 1 is currently traveling in the overtaking lane, the process proceeds to step 53.

In step 53, the presence of the following vehicle 2 is detected based on the image data of the rear camera 4, and the distance between the subject vehicle 1 and the following vehicle 2 is calculated based on the detection output of the clearance sonar 8. Next, in step 54, it is determined whether or not the following vehicle 2 has approached the host vehicle 1. In this case, the presence of the following vehicle 2 is confirmed based on the image data of the rear camera 4, and when the distance between the subject vehicle 1 and the following vehicle 2 calculated based on the detection output of the clearance sonar 8 is within the set distance range, it is determined that the following vehicle 2 has approached the subject vehicle 1. When it is determined that the following vehicle 2 has approached the host vehicle 1, the process proceeds to step 55.

In step 55, the traveling lane space 40 in which the host vehicle 1 can enter the traveling lane located in front of the host vehicle 1 is detected using the image data of the front camera 3*a*, 3*b*, the detection output of the long-range millimeter-wave radar 5, the detection output of the medium-range millimeter-wave radar 6*b*, and the detection output of the LIDAR 7*b*. Next, in step 56, it is determined whether or not it is possible to change the lane from the overtaking lane to the traveling lane of the host vehicle 1. In this case, when the traveling lane space 40 in which the host vehicle 1 can enter the traveling lane located in front of the host vehicle 1 is detected, it is determined that the lane can be changed from the overtaking lane to the traveling lane on the host vehicle 1. When the traveling lane space 40 in which the host vehicle 1 can enter is not detected, it is determined that it is impossible to change the lane from the overtaking lane to the traveling lane of the host vehicle 1, and the processing cycle ends.

When it is determined in step 56 that it is possible to change the lane of the host vehicle 1 from the overtaking lane to the traveling lane, the process proceeds to step 57. In step 57, the notification device 22 notifies the driver of the host vehicle 1 of the approach of the following vehicle 2 to the host vehicle 1, thereby prompting the driver of the host vehicle 1 to change the lane to the traveling lane.

On the other hand, when it is determined in step 51 that the road on which the subject vehicle 1 is currently traveling is not a plurality of lanes, or when it is determined in step 52 that the subject vehicle 1 is not currently traveling in the overtaking lane, or when it is determined in step 54 that the following vehicle 2 is not approaching the subject vehicle 1, the process proceeds to step 58. In step 58, the notification device 22 stops notifying the driver of the host vehicle 1 of the approach of the following vehicle 2 to the host vehicle 1, and thereby stops prompting the driver of the host vehicle 1 to change the lane to the traveling lane. Therefore, when the host vehicle 1 changes the lane from the overtaking lane to the traveling lane, it is determined in step 52 that the host vehicle 1 is not currently traveling in the overtaking lane. Alternatively, in step 54, it is determined that the following vehicle 2 is not approaching the host vehicle 1. Therefore, the notification device 22 stops notifying the driver of the host vehicle 1 of the approach of the following vehicle 2 to the host vehicle 1.

As described above, the following vehicle approach notification device according to the present disclosure includes the detection device 18 capable of detecting the approach of the following vehicle 2 to the subject vehicle 1, the notification device 22 notifying the driver of the subject vehicle 1 of the approach of the following vehicle 2 to the subject vehicle 1, and the processor 15. In the present disclosure, the processor 15 acquires information on a lane of a road on which the host vehicle 1 is traveling. When the approach of the following vehicle 2 to the host vehicle 1 is detected by the detection device 18 during the fast lane 35*a* traveling, the processor 15 determines whether or not the lane can be changed from the fast lane 35*a* to the traveling lane 34*a* on the host vehicle 1. At this time, when it is determined that the lane can be changed from the fast lane 35*a* to the traveling lane 34*a* on the host vehicle 1, the notification device 22 notifies the driver of the host vehicle 1 of the approach of the following vehicle 2 to the host vehicle 1. When it is determined that the lane cannot be changed from the fast lane 35*a* to the traveling lane 34*a* on the host vehicle 1, the notification device 22 stops causing the driver of the host vehicle 1 to notify the approach of the following vehicle 2 to the host vehicle 1.

In this case, in the embodiment according to the present disclosure, the detection device 18 can detect the presence of the traveling lane space 40 in which the host vehicle 1 can enter. When the approach of the following vehicle 2 to the host vehicle 1 is detected by the detection device 18 during the fast lane 35*a* traveling, the detection device 18 may detect the presence of the traveling lane space 40 in which the host vehicle 1 can enter. In this case, the processor 15 determines that the lane can be changed from the fast lane 35*a* to the traveling lane 34*a* on the host vehicle 1.

In the embodiment according to the present disclosure, as can be seen from the flow chart shown in FIG. 5, even when it is determined in step 54 that the following vehicle 2 has approached the host vehicle 1, it may be determined in step 56 that it is not possible to change the lane from the fast lane 35*a* to the traveling lane 34*a* of the host vehicle 1. At this time, notification of the approach of the following vehicle 2 to the host vehicle 1 to the driver of the host vehicle 1 is stopped. In step 56, when it is determined that the lane can be changed from the fast lane 35*a* to the traveling lane 34*a* on the host vehicle 1, the driver of the host vehicle 1 is notified of the approach of the following vehicle 2 to the host vehicle 1.

That is, in other words, in the embodiment according to the present disclosure, the approach of the following vehicle 2 to the host vehicle 1 may continue to be detected by the detection device 18 during the fast lane 35*a* travel. Even in this case, when the detection device 18 does not detect the presence of the traveling lane space 40 in which the host vehicle 1 can enter, the processor 15 continues to stop the notification device 22 from notifying the driver of the host vehicle 1 of the approach of the following vehicle 2 to the host vehicle 1. When the detection device 18 detects the presence of the traveling lane space 40 in which the host vehicle 1 can enter, the notification device 22 notifies the driver of the host vehicle 1 of the approach of the following vehicle 2 to the host vehicle 1.

When the following vehicle 2 approaches the host vehicle 1 during the fast lane 35*a* traveling and the following vehicle 2 is performing the fuzzy driving with respect to the host vehicle 1, it is highly likely that the driver of the host vehicle 1 is burnt. At this time, when the driver of the host vehicle 1 is notified of the approach of the following vehicle 2 to the host vehicle 1 even though the lane change of the host vehicle 1 is impossible, there is a possibility that the driver of the host vehicle 1 is more burnt. In this embodiment, as described above, when lane change of the host vehicle 1 is impossible, notification of the approach of the following vehicle 2 to the host vehicle 1 to the driver of the host vehicle 1 is continued to be stopped. Therefore, it is possible to avoid causing a large burning to the driver of the host vehicle 1.

Incidentally, when the following vehicle 2 approaches the host vehicle 1 during the fast lane 35*a* traveling, it is determined that the lane can be changed from the fast lane 35*a* to the traveling lane 34*a* on the host vehicle 1 in some cases. In this case, when the driver of the host vehicle 1 recognizes the approach of the following vehicle 2 and the traveling lane space 40 in which the host vehicle 1 can enter, it is preferable to change the approach notification method of the following vehicle 2 to the driver of the host vehicle 1 to an approach notification method that reduces the degree of focus caused by the driver, as compared with the case where the driver of the host vehicle 1 does not recognize the approach of the following vehicle 2 and the traveling lane space 40 in which the host vehicle 1 can enter. Therefore, in another embodiment according to the present disclosure, the approach notification method of the following vehicle 2 to the driver of the host vehicle 1 is changed according to whether or not the driver of the host vehicle 1 recognizes the approach of the following vehicle 2 and the traveling lane space 40 in which the host vehicle 1 can enter.

Figure 6:
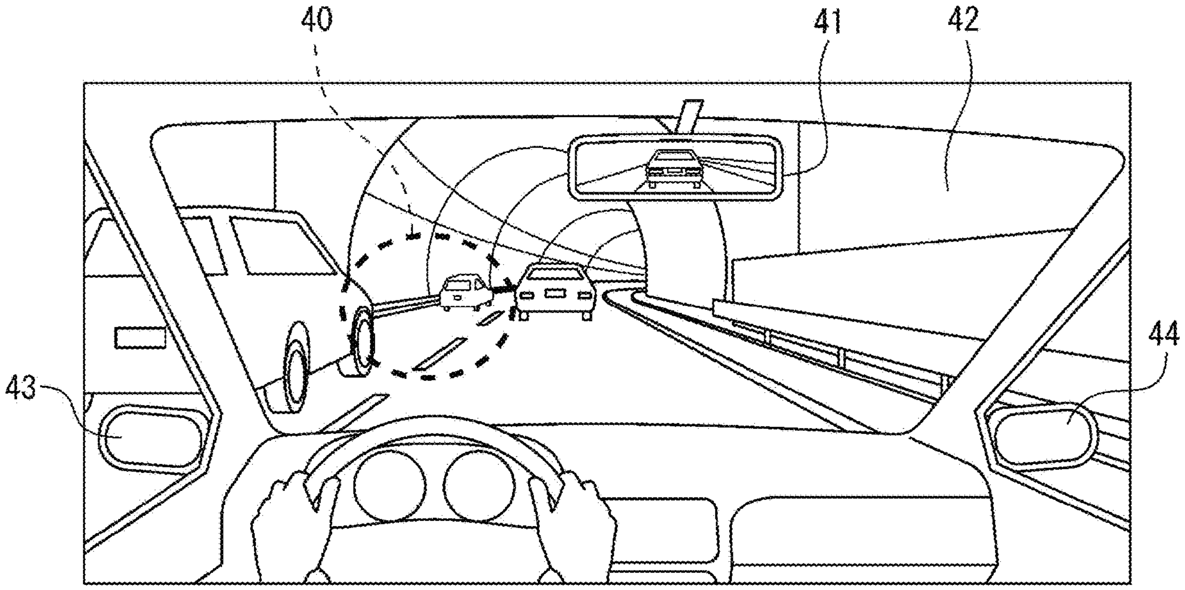
FIG. 6 is a front view of the host vehicle when viewed from inside of a vehicle cabin.

Next, another embodiment of the present disclosure will be described with reference to FIG. 6. Note that FIG. 6 is a diagram when the vehicle 1 is viewed from the front side from the vehicle cabin. In this other embodiment, based on the detection result of the line-of-sight detection device 9 (FIG. 1) installed in the vehicle cabin, it is determined whether or not the driver of the host vehicle 1 recognizes the approach of the following vehicle 2 and the traveling lane space 40 in which the host vehicle 1 can enter. As described above, the line-of-sight detection device 9 includes, for example, an infrared LED for irradiating the eyeball of the driver with infrared rays, and an infrared camera for detecting the reflected light of the infrared rays in the cornea, and can detect the direction of the line of sight of the driver from the reflected light of the infrared rays in the cornea.

For example, when the line-of-sight detection device 9 detects that the direction of the driver's line of sight is the inter-mirror 41 that captures the rear side of the host vehicle 1, it can be determined that the driver recognizes the approach of the following vehicle 2. Further, when the line-of-sight detection device 9 detects that the direction of the driver's line of sight is a portion surrounded by a broken line through the front window 42 of the host vehicle 1, it can be determined that the driver recognizes the traveling lane space 40 in which the host vehicle 1 can enter. That is, when it is detected that the direction of the driver's line of sight is the traveling lane space 40 in which the host vehicle 1 can enter, it can be determined that the driver recognizes the traveling lane space 40 in which the host vehicle 1 can enter. Therefore, in an example according to the present disclosure, when the line-of-sight detection device 9 detects a case where the driver's line-of-sight direction is the inter-mirror 41 and a case where the driver's line-of-sight direction is the traveling lane space 40, it is determined that the driver recognizes the approach of the following vehicle 2 and the traveling lane space 40 in which the host vehicle 1 can enter.

Further, as another example, when the line-of-sight detection device 9 detects that the number of lines of sight directed to the inter-mirror 41 is equal to or greater than a certain number of times, it is determined that the driver recognizes the approach of the following vehicle 2. When it is detected that the number of times of the line of sight directed to the traveling lane space 40 is equal to or more than a certain number of times, or when it is detected that the time in which the line of sight is directed to the traveling lane space 40 is equal to or more than a certain time, it is determined that the driver recognizes the traveling lane space 40 in which the host vehicle 1 can enter. In addition, it is considered that when changing the lane, the driver of the host vehicle 1 confirms the side mirror 43, and in some cases, also confirms the side mirror 44. Therefore, in addition to the inter-mirror 41 and the traveling lane space 40, the side mirror 43 may be checked, and in some cases, the line-of-sight detection device 9 may detect that the side mirrors 43 and 44 have been checked. At this time, it is determined that the driver recognizes the approach of the following vehicle 2 and the traveling lane space 40 in which the host vehicle 1 can enter.

Figure 7:
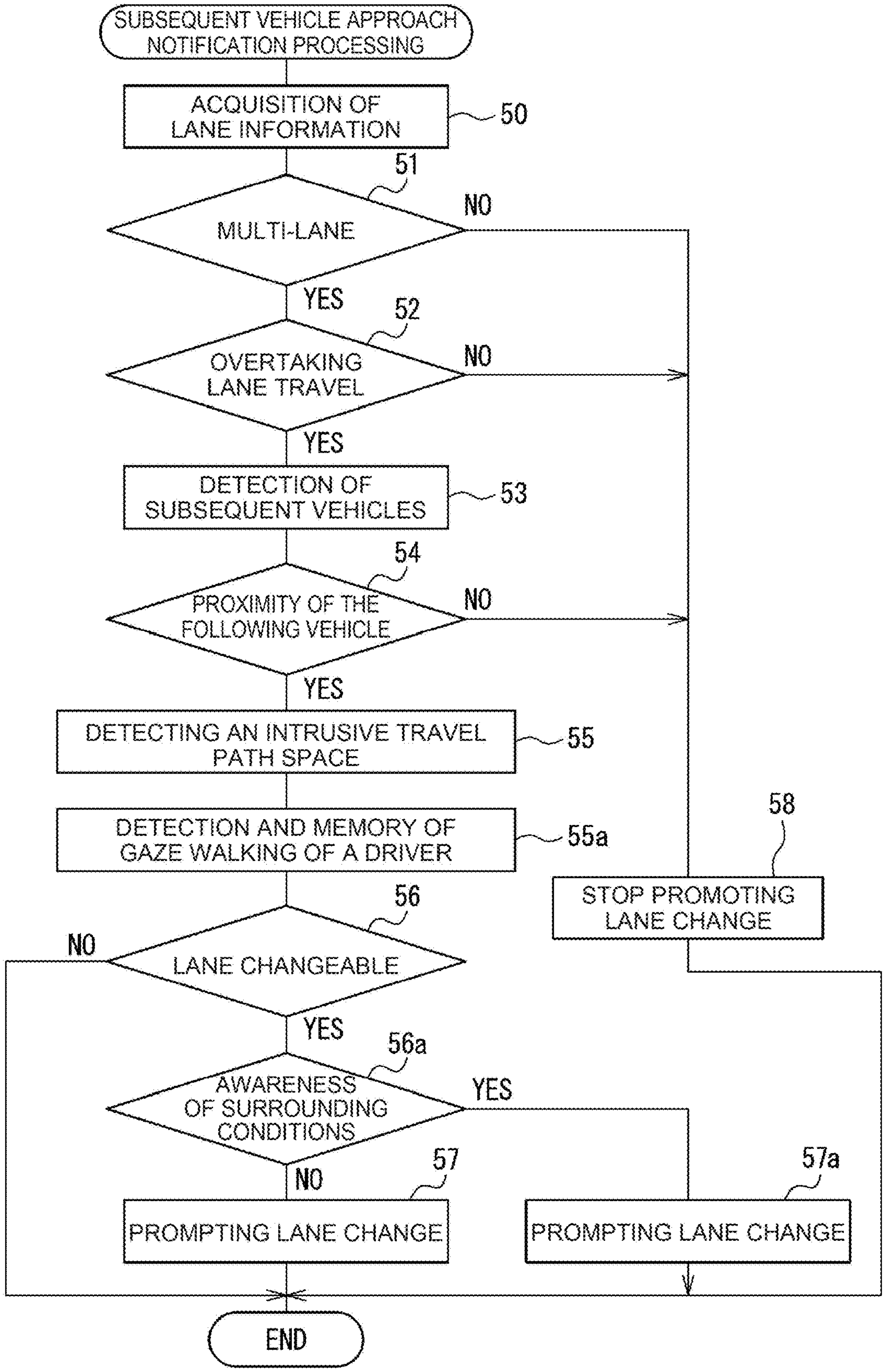
FIG. 7 is a flowchart for executing another embodiment of a following vehicle approach notification process.

FIG. 7 shows a routine for carrying out another embodiment as described above. This routine is also executed by interruption at regular time intervals in the electronic control unit 13 of the host vehicle 1. Note that steps 50, 51, 52, 53, 54, 55, 56, 57, and 58 in the routine shown in FIG. 7 are the same as steps 50, 51, 52, 53, 54, 55, 56, 57, and 58 in the routine shown in FIG. 5. The only difference between the routine shown in FIG. 7 and the routine shown in FIG. 5 is that the routine shown in FIG. 7 adds a 55*a*, 56*a*, 57*a* of steps. Therefore, the description from step 50 to step 55 is omitted, and the description is started from step 55*a*.

Referring to FIG. 7, it is determined in step 54 that the following vehicle 2 has approached the host vehicle 1. In step 55, when the traveling lane space 40 in which the host vehicle 1 can enter is detected, the line-of-sight detection device 9 detects the line-of-sight of the driver in the step 55*a*. This detection of the direction of the driver's line of sight is repeatedly performed every interruption time as long as it is determined in step 54 that the following vehicle 2 has approached the host vehicle 1. The detection result of the direction of the driver's line of sight is stored in the memory 16. Next, when it is determined in step 56 that the lane can be changed from the overtaking lane to the traveling lane on the host vehicle 1, the process proceeds to step 56*a*. In the step-wise 56*a*, it is determined whether or not the driver is aware of the surrounding situation, that is, whether or not the driver is aware of the approach of the following vehicle 2 and of the traveling lane space 40 in which the host vehicle 1 can enter, based on the detection result of the direction of the driver's line of sight stored in the memory 16.

In step 56*a*, when it is determined that the driver does not recognize the approach of the following vehicle 2 and the traveling lane space 40 in which the host vehicle 1 can enter, the process proceeds to step 57. Then, the notification device 22 notifies the driver of the host vehicle 1 of the approach of the following vehicle 2 to the host vehicle 1. Accordingly, the driver of the host vehicle 1 is prompted to change the lane to the traveling lane. At this time, the notification is performed in the same manner as the approach notification method of the following vehicle 2 to the driver in step 57 of the routine shown in FIG. 5. On the other hand, in the step 56*a*, when it is determined that the driver recognizes the approach of the following vehicle 2 and the traveling lane space 40 in which the host vehicle 1 can enter, the process proceeds to the step 57*a*. Then, the notification device 22 notifies the driver of the host vehicle 1 of the approach of the following vehicle 2 to the host vehicle 1. Accordingly, the driver of the host vehicle 1 is prompted to change the lane to the traveling lane. At this time, the notification is performed by an approach notification method that reduces the degree of focus caused by the driver as compared with the approach notification method of the following vehicle 2 to the driver in step 57 of the routine shown in FIG. 5. That is, the notification method to the driver is changed.

As described above, in this alternative embodiment, the approach of the following vehicle 2 to the host vehicle 1 may be detected by the detection device 18 during the fast lane 35*a* travel. At this time, when it is determined that the lane can be changed from the fast lane 35*a* to the traveling lane 34*a* on the host vehicle 1, the processor 15 determines whether or not the driver of the host vehicle 1 has recognized the approach of the following vehicle 2 and the traveling lane space 40 in which the host vehicle 1 can enter. In accordance with the determination result, the method of notifying the driver of the host vehicle 1 of the approach of the following vehicle 2 to the host vehicle 1 is changed.

In this case, in this alternative embodiment, as described above, the notification of the approach of the following vehicle 2 to the host vehicle 1 includes the prompting of the lane change to the traveling lane 34*a* of the host vehicle 1 by at least one of the word indication, the sound or the sound. In accordance with the determination result, the content of the wording display, the content of the sound, the tone of the sound, the display timing of the wording display, the generation timing of the sound, or the generation timing of the sound are changed. For example, when the driver of the host vehicle 1 recognizes the approach of the following vehicle 2 and the traveling lane space 40 in which the host vehicle 1 can enter, the tone of the buzzer is changed to a gentle tone as compared with the case where the driver of the host vehicle 1 does not recognize the approach of the following vehicle 2 and the traveling lane space 40 in which the host vehicle 1 can enter. Alternatively, the display timing of the wording display, the generation timing of the sound, or the generation timing of the sound is delayed by 1 second to 2 seconds.

What is claimed is:

1. A following vehicle approach notification device mounted on a host vehicle comprising:

a detection device including a sonar configured to detect a distance between a following vehicle and the host vehicle to determine an approach of the following vehicle, a front camera configured to detect a lane on which the host vehicle is traveling and a traveling lane space that the host vehicle is able to enter, and an inner camera configured to detect a direction of a line-of-sight of a driver of the host vehicle;

a notification device configured to notify the driver of the approach of the following vehicle; and a processor configured to:

communicate with the detection device and the notification device via a network, and determine, based on the detected traveling lane space, whether the lane of the host vehicle is able to be changed from a fast lane to a slow lane when the approach of the following vehicle is detected by the detection device during traveling along the fast lane, wherein the notification device is further configured to:

notify the driver of the approach of the following vehicle in a case where determination is made that the lane of the host vehicle is able to be changed from the fast lane to the slow lane, and stop notifying the driver of the approach of the following vehicle in a case where determination is made that the lane of the host vehicle is not able to be changed from the fast lane to the slow lane, the processor is further configured to:

in a case where determination is made that the lane of the host vehicle is able to be changed from the fast lane to the slow lane when the approach of the following vehicle is detected by the detection device while the host vehicle is traveling in the fast lane, determine, based on the detected line-of-sight of the driver, whether the driver has recognized the approach of the following vehicle and the traveling lane space that the host vehicle is able to enter, and change a method of notifying the driver of the approach of the following vehicle in accordance with a determination result of whether the driver has recognized the approach of the following vehicle and the traveling lane space that the host vehicle is able to enter, and the notification device is further configured to provide a notification prompting the driver to change the lane of the host vehicle to the slow lane using at least one of a text display, a voice message, and a sound.

2. The following vehicle approach notification device according to claim 1, wherein content of the text display, content of the voice message, and a tone of the sound, a display timing of the text display, a generation timing of the voice message, or a generation timing of the sound is changed in accordance with the determination result.

* * * * *